United States Patent
Soppera

(10) Patent No.: US 7,367,054 B2
(45) Date of Patent: Apr. 29, 2008

(54) PACKET DATA COMMUNICATIONS

(75) Inventor: Andrea Soppera, Ipswich (GB)

(73) Assignee: British Telecommunications public limited company, London (GB)

(*) Notice: Subject to any disclaimer, the term of this patent is extended or adjusted under 35 U.S.C. 154(b) by 720 days.

(21) Appl. No.: 10/297,844

(22) PCT Filed: Jun. 26, 2001

(86) PCT No.: PCT/GB01/02833

§ 371 (c)(1),
(2), (4) Date: Dec. 11, 2002

(87) PCT Pub. No.: WO02/03653

PCT Pub. Date: Jan. 10, 2002

(65) Prior Publication Data

US 2003/0172289 A1    Sep. 11, 2003

(30) Foreign Application Priority Data

Jun. 30, 2000    (EP) ................... 00305556

(51) Int. Cl.
*G06F 15/16* (2006.01)
*G06F 11/30* (2006.01)
*G08B 23/00* (2006.01)
*G06F 12/14* (2006.01)
*H04L 9/32* (2006.01)

(52) U.S. Cl. .................. 726/13; 726/22; 713/153
(58) Field of Classification Search .......... 726/13, 726/22; 713/153

See application file for complete search history.

(56) References Cited

U.S. PATENT DOCUMENTS

| | | | | |
|---|---|---|---|---|
| 5,367,523 | A | * | 11/1994 | Chang et al. ............... 370/235 |
| 5,371,731 | A | | 12/1994 | Pratt et al. |
| 5,649,110 | A | | 7/1997 | Ben-Nun et al. |
| 5,692,124 | A | * | 11/1997 | Holden et al. ................. 726/2 |
| 6,005,851 | A | | 12/1999 | Craddock et al. |
| 6,735,702 | B1 | * | 5/2004 | Yavatkar et al. ............. 726/13 |
| 6,816,910 | B1 | * | 11/2004 | Ricciulli ..................... 709/237 |
| 6,944,673 | B2 | * | 9/2005 | Malan et al. ............... 709/237 |
| 6,971,028 | B1 | * | 11/2005 | Lyle et al. .................... 726/25 |
| 6,973,040 | B1 | * | 12/2005 | Ricciulli ..................... 370/241 |
| 7,062,782 | B1 | * | 6/2006 | Stone et al. .................. 726/22 |
| 2001/0047387 | A1 | * | 11/2001 | Brockhurst .................. 709/203 |
| 2002/0032793 | A1 | * | 3/2002 | Malan et al. ............... 709/232 |
| 2002/0032871 | A1 | * | 3/2002 | Malan et al. ............... 713/201 |
| 2002/0035698 | A1 | * | 3/2002 | Malan et al. ............... 713/201 |
| 2002/0120853 | A1 | * | 8/2002 | Tyree ........................ 713/188 |
| 2002/0199109 | A1 | * | 12/2002 | Boom ........................ 713/188 |

OTHER PUBLICATIONS

Free On-Line Dictionary Of Computing "Quality of Service" last updated Jul. 30, 1998 Retrieved from the Internet Mar. 31, 2006 http://foldoc.org/foldoc/foldoc.cgi?query=quality+of+service.*

(Continued)

*Primary Examiner*—Gilberto Barron
*Assistant Examiner*—Virgil Herring
(74) *Attorney, Agent, or Firm*—Nixon & Vanderhye P.C.

(57) ABSTRACT

A Denial of Service attack received at a network node from a packet data communications network is managed by tracing the path of predominantly malicious data packets arriving at the network node. The attack may be mitigated by selecting a router along the detected path and requesting the router to alter its handling of the data traffic. In one embodiment, the selected router installs a filter for data directed at the network node. In a different embodiment, the router alters a Quality of Service setting for the data directed at the network node. The network node may also request the router to mark all data being forwarded to it, to allow the network to characterize the data and determine to what extent it consists of malicious data.

19 Claims, 5 Drawing Sheets

OTHER PUBLICATIONS

Free On-Line Dictionary of Computing "Throughput" last updated May 22, 2001 Retrieved from the Internet Mar. 31, 2006 http://foldoc.org/foldoc/foldoc.cgi?throughput redirected to http://foldoc.org/foldoc/foldoc.cgi?data+transfer+rate.*

Bellovin, "ICMP Traceback Messages" 'Online' XP002158911, Retrieved from the Internet: URL:http://community.roxen.com/developers/idocs/drafts/draft-bellovin-itrace-00.txt 'retrieved on Jan. 22, 2001!

* cited by examiner

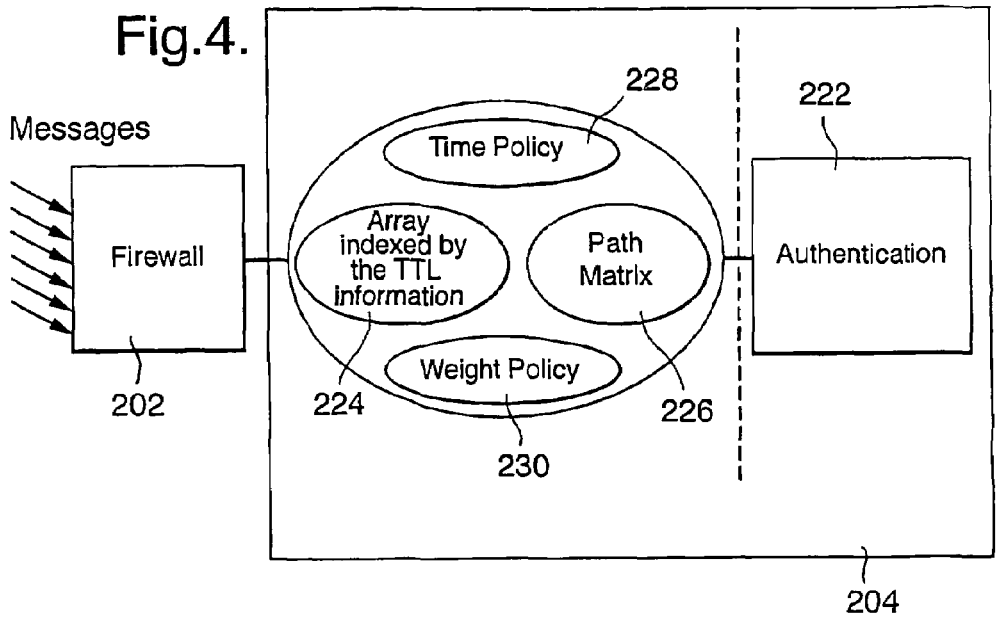
Fig.4.
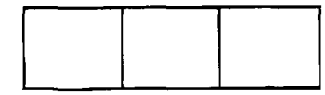
Fig.5A.
Next Router / Source Router / Previous Router
Fig.5B.
INGRESS ARRAY
| 255 | A B |
| 254 | A B C |
| 253 | B C D |
| 252 | C D E |
| 251 | D E F |
| 250 | E F G |
| 249 | |
| ⋮ | |
Fig.5C.
PATH MATRIX
| Weight | Time | Path |
|---|---|---|
| 350 | 10 | A B C D E F |
| | | |
| | | |
| | | |
| | | |
| | | |

PACKET DATA COMMUNICATIONS

BACKGROUND

1. Technical Field

The present invention relates to packet data communications, and in particular, but not exclusively, to procedures, mechanisms and apparatus for the detection and mitigation of Denial of Service attacks in a public data communications network such as the Internet.

2. Related Art

Denial of Service attacks are designed to consume the resources of a network host or the network itself, thereby denying or at least degrading service to legitimate users. Denial of Service attacks are currently a difficult security problem to resolve because they are simple to implement, difficult to detect and very difficult to trace. Most work in this area has focused on tolerating attacks by mitigating their effects on the victim. Another option is to trace attacks back to the origin so they can be eliminated near the source.

Determining the source of an attack, known as the traceback problem, is extremely difficult due to the stateless nature of Internet routing. Attackers hide their location using incorrect or "spoofed" IP source addresses. As these packets traverse the Internet, the true origin is lost and the victim is left with no useful information as to the location of the attacker. One solution is to probabilistically send a tracing packet, called an "itrace" packet, with the traced packet at a forwarding router, as described in Bellovin: ICMP Traceback messages ("draft-bellovin-itrace-OO.txt"), AT&T Labs, March 2000.

When forwarding packets, routers which are itrace-enabled, generate with an extremely low probability a traceback message that is sent along in parallel with the data to the destination. With enough traceback messages from enough routers along the path, the traffic source and path can be determined by the host under attack.

BRIEF SUMMARY

In accordance with one aspect of the invention there is provided a method of managing data traffic received at a network node from a packet data communications network, said method comprising:

a) monitoring tracing data allowing the identity of at least one remote packet forwarding node forwarding at least some of the received data traffic to be found;

b) transmitting a request for the remote packet forwarding node to alter its handling of data traffic.

Thus, the network node may resolve traffic data issues by enlisting the cooperation of a remote packet forwarding node detected as being on a forwarding path for data received at the network node.

The remote packet forwarding node may selectively alter the handling of data traffic directed at the network node, thereby allowing the network node's traffic data issues to be resolved without affecting the delivery of traffic to other network nodes.

The request may for example be to mark data traffic being forwarded with a characteristic allowing the data traffic being forwarded to be distinguished from data traffic being forwarded via a different path, to allow the network node to classify data received via the selected data forwarding node.

The request may alternatively cause the remote packet forwarding node to reduce the amount of data traffic received at the network node, in order to thereby resolve traffic data problems being experienced at the network node.

According to a further aspect of the invention, there is provided a method of managing data traffic received at a packet forwarding node in a packet data communications network, said method comprising:

a) forwarding data traffic destined towards a network node;

b) receiving a request from the network node for the remote packet forwarding node to alter its handling of data traffic; and c) altering the handling of traffic data at the remote packet forwarding node in accordance with the request.

In accordance with a yet further aspect of the invention there is provided a method of detecting a path of data traffic transmitted through a packet data communications network, said method comprising:

(a) receiving data at a network node in the format of tracing data generated at packet forwarding nodes in the data communications network;

(b) collating the said received data to detect potential paths of the received data traffic;

(c) weighting the received data in dependence on an apparent distance of the packet forwarding node generating the tracing data from the said network node.

In accordance with a yet further aspect of the invention there is provided a method of reducing congestion problems experienced by a network node by altering the handling of data traffic at a packet forwarding node in a packet data communications network, said method comprising:

(a) receiving said traffic data at said packet forwarding node; and (b) reducing a Quality of Service setting for the received traffic data, such that the traffic data is more likely to be dropped by the packet forwarding nodes in the communications network to which the traffic data is forwarded.

In accordance with a yet further aspect of the invention there is provided a method of transmitting traceback data from a packet forwarding node in a packet data communications network, said method comprising transmitting said traceback data periodically in accordance with a selected probability, wherein said selected probability is variable.

BRIEF DESCRIPTION OF THE DRAWINGS

Features and advantages of the various aspects of the invention will become apparent from consideration of the following description of preferred embodiments of the invention, to be given by way of example only, made with reference to the accompanying drawings, wherein:

FIG. 4 shows a schematic illustration of a monitor agent;

FIG. 5 shows a schematic illustration of data stored in the monitor agent;

DETAILED DESCRIPTION OF EXEMPLARY EMBODIMENTS

Figure 1:
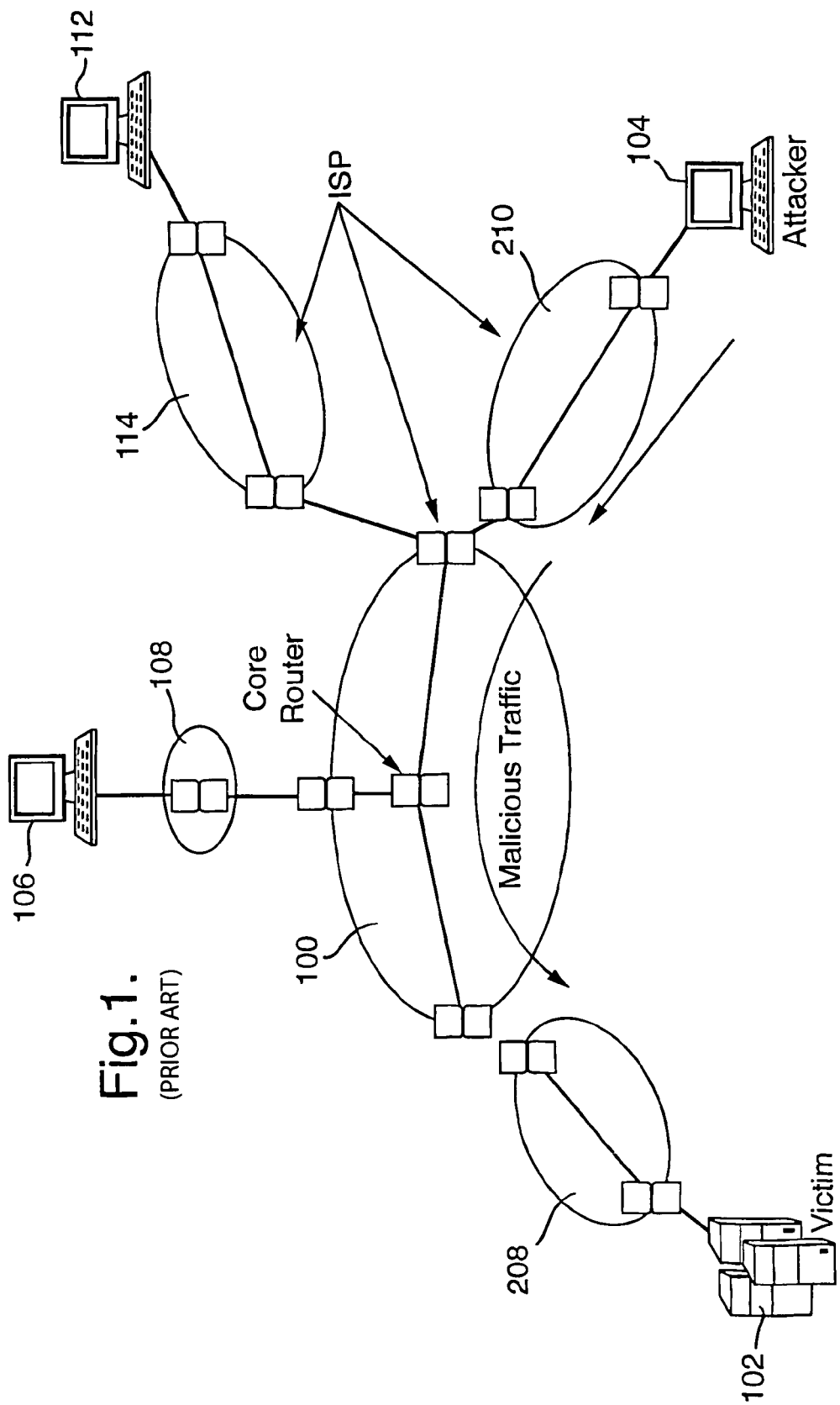
FIG. 1 shows a schematic illustration of a packet data communications network.

FIG. 1 illustrates an exemplary embodiment of a packet-switched public data communications network, like the Internet, in which the present invention may be implemented. The entire network consists of a number of different sub networks, or domains, each administered by a different entity, referred to as an Internet Service Provider (ISP). These different domains include a core router domain 100, forming a backbone network through which large amounts of traffic data is routed, and a number of access domains 108, 114, 208, 210, each being administered by a different ISP and containing variable numbers of packet switching routers.

FIG. 1 illustrates a Denial of Service attack being perpetrated on a user 102, referred to as the victim, connected to the network via local ISP 208. The victim 102 may for example consist of a local intranet connected to the ISP 208 via a firewall. The resources on the victim's side may include, for example, a Web server providing data to clients throughout the public data communications network. The clients within the public data communications network include legitimate users 106, 112, connected to the network via their own local ISPs 108, 114. During a Denial of Service attack, an attacker 104 directs a large amount of malicious traffic towards the victim 102. The attacker 104 may be connected to the public data communications network at any router. In the example shown in FIG. 1, the attacker 104 is connected via an ISP 210 remote from the victim's ISP 208.

Figure 2:
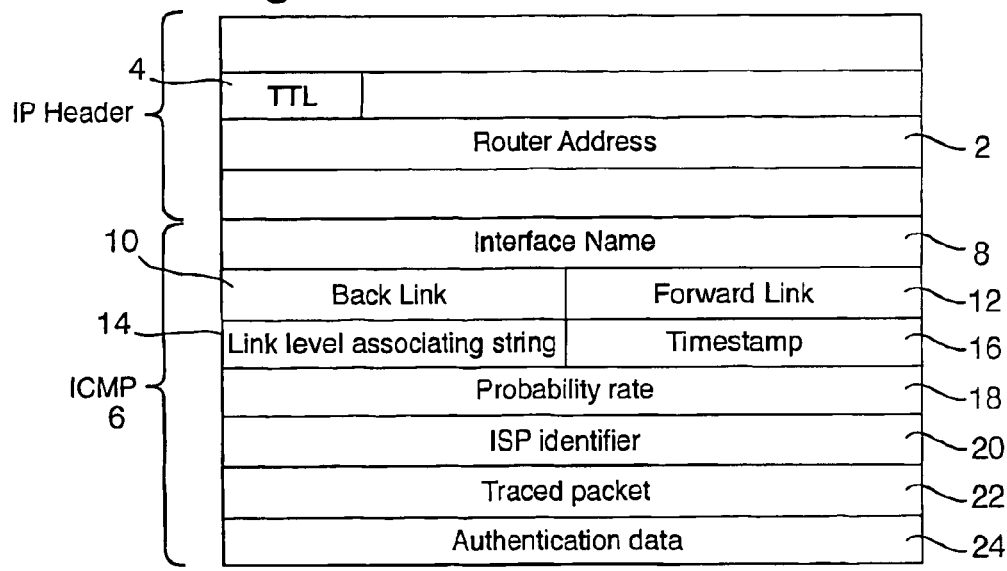
FIG. 2 shows a schematic illustration of a traceback packet.

The itrace message is an Internet Control Message Protocol (ICMP) packet with various defined properties. Its format is illustrated in FIG. 2. The IP Header contains as the source address 2 the address of the router generating and emitting the packet. The initial Time to Live (TTL) field 4 must be set to 255. If the traceback packet follows the same path as the data packets, this provides an indication of the distance from this router to the destination, since it is decremented by each router it traverses.

The ICMP payload 6 contains a field 8 containing the interface name of its generator. Back link field 10 contains information of the previous hop. Forward link field 12 contains information of the next hop. These two links may be used to reconstruct easily a chain of traceback messages.

Link level association string field 14 contains information that is known and used by routers, which is used to tie together messages emitted by adjacent routers.

Timestamp field 16 contains information in NTP format is very useful for the authentication of the message. It could be used like a nonce value to characterize and to render each packet different. If the router had the history of the ICMP messages sent, this information could be used in some process as to authenticate the ICMP Trace-back messages. The victim will use this field during the monitoring process.

In this embodiment of the invention, two new subfields are provided, namely probability rate field 18 and ISP identifier field 20. Probability rate field 18 contains information which is configurable. In the protocol of this embodiment, a control message can set the rate of the traceback packets at a router. This field is used to give the correct weight to a traceback packet, if different routers are set at different probability rates, during the selection of the attacker path or during a monitoring process, to be described in further detail below.

The ISP identifier field 20 identifies which entity administrates the router that has sent the traceback packet. This field is used during the authentication of the tradeback message.

The traced packet field 22 contains information copied from the traced packet which triggered the generation of the traceback packet. The header information from the traced packet, or the whole packet may be copied.

The authentication data field 24 contains authentication data for the traceback packet. It may be in the form of a public key infrastructure (PKI) certificate, or a secret key message authentication code, preferably a HMAC as described in RFC-2104: HMAC: Keyed-Hashing for Message Authentication, IETF. HMAC requires a cryptographic hash function (H) and a secret key (K). The key K is used in XOR with the message field Each ISP has secret information (K) for the routers that it manages. The secret could be similar for each router registered to the same ISP. Using the ISP identifier, contact can be made with the ISP to authenticate the traceback message. The contact is preferably made from one ISP to another. The ISPs implementing protocols according to this invention may communicate using asymmetric cryptography in order to exchange messages, including the secret information (K) used to sign the traceback messages. A server containing the encryption information and the keys is installed in each ISP.

Figure 3:
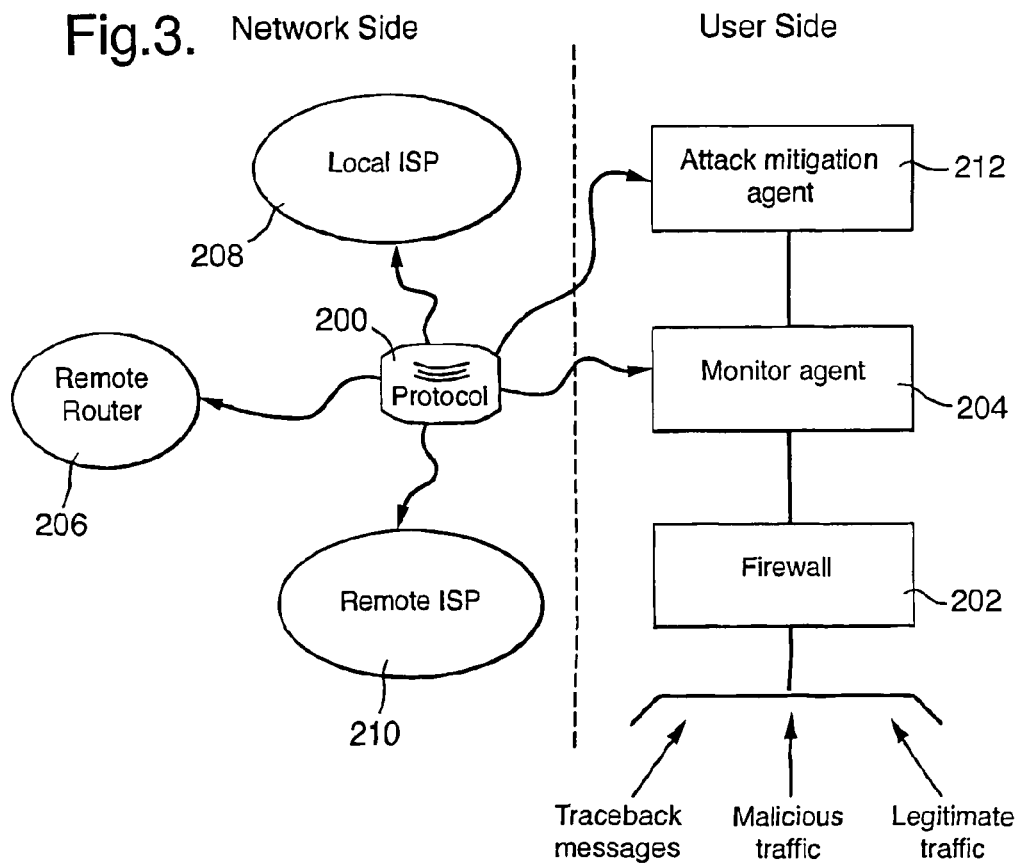
FIG. 3 shows a schematic illustration of a protocol stack shared by different network entities.

FIG. 3 illustrates a new protocol implemented in accordance with this embodiment of the invention, represented by protocol stack 200, which is implemented in various entities, both on the network side and the user (potential victim) side. On the user side, legitimate traffic, malicious traffic, and traceback messages are received at a firewall 202 interposed between the local ISP network and the victim's intranet. A monitor agent 204 collates information received in traceback messages passed to it from firewall 202, and detects a Denial of Service situation as it arises. Via the protocol 200, the monitor agent 204 is able to communicate with various entities on the network side, including either directly or indirectly, a selected remote router 206 which is detected to lie along a probable path of malicious traffic received at the user side. Both the local ISP 208 and the remote ISP 210, managing the remote router 206, may also be involved in this process via the protocol 200. Once a Denial of Service situation has been detected, an attack mitigation agent 212 on the user side is used to initiate one or more attack mitigation procedures. The attack mitigation agent 212 communicates, either directly or indirectly, with a selected remote router 206, to implement filtering or other procedures at the remote router 206. Both the local ISP 208 and the remote ISP 210 may be involved in this procedure.

FIG. 4 illustrates elements of the monitor agent 204 in greater detail. Traceback message data received from firewall 202 is placed in ingress array 224, indexed in accordance with the TTL information received in the traceback packet. A time policy 228 is used to determine the amount of time for which data relating to a packet remains in the ingress array 224. Preferably, information relating to a traceback packet is kept within the ingress array 224 for a predetermined period, after which it is discarded. The ingress array 224 is analyzed continually for a linked set of back link/source address/forward link combinations indicating a set of traceback packets received along a path via which a significant amount of traffic is being received at the user side. If such a traffic path is detected, the data is stored in a path matrix 226. The path matrix 226 is arranged such that, in a Denial of Service situation, the path along which most malicious traffic is being received is generally distinguishable over other paths via which legitimate traffic is being received. A weight policy 230 is implemented to adjust the weight of different traffic paths detected in the path matrix, such that the most likely attacker path is given the highest weight. The time policy 228 is also applied to the path matrix 226, so that the identified paths only remain within the path matrix for a predetermined time unless the path is refreshed by the detection of the same, or at least coincident, paths in the ingress array within that predetermined time.

As shown in FIG. 5A, in the ingress array the data relating to the received traceback packets includes the three IP addresses of the next router, the source router and the previous router at the router from which the traceback packet was generated. As shown in FIG. 5B, a linked list of tracebacks packets identifying a traffic path (A, B, C, D, E, F and G all being router IP addresses along the identified path) may be detected in the ingress array by matching the source and the previous IP addresses from one router with the next and source IP addresses from a router which is one hop further away. The detected path is then placed in the path matrix, FIG. 5C. A weight may be attached to each detected traffic path, by implementing a weight policy dependent upon the distance of the generating router from the victim, as indicated in the TTL field. The policy preferably favors those traceback packets received from routers close to the victim, for example one having the weight assigned to each packet reducing by half with each additional hop away, as shown in the Table below.

| TTL information | Packet weight |
| --- | --- |
| 255 | $2^{15}$ |
| 254 | $2^{14}$ |
| 253 | $2^{13}$ |
| ... | ... |
| ... | ... |
| 240 | 2 |

The weight calculated for a particular detected path is calculated as an aggregate, for example a sum, of the individual packet weights forming the path. Therefore, a path detected and placed in the path matrix includes a calculated aggregate weight. The aggregate weight is dependent upon the distances from the victim that the path spans. The higher weight given to routers apparently received from a closer router relates to the fact that, while it is possible to "spoof" a traceback message having a TTL which is larger than the distance the attacker is away from the victim, since the TTL of 255 is the maximum possible TTL and it is decremented for each traversed router, it is impossible for the attacker to "spoof" a packet with a TTL less than its distance away from the victim. Therefore, traceback messages received from a closer router are treated as more secure and are given a higher weight.

The frequency of the appearance of paths within the received traceback messages is also reflected in the weight stored in the path matrix. If a path is detected again after a previous detection, the weight value of the whole path is increased, for example doubled.

Once a weight in the path matrix exceeds a predetermined threshold, this triggers a suspected attack processing procedure. It may of course be that the receipt of heavy traffic is due to legitimate reasons known by the user (for example the release of new software on the site), and it is important to allow the user to determine whether a Denial of Service attack is occurring.

During a DoS attack, an attack could be launched in order to deceive the victim into recognizing an incorrect attacker path. Furthermore, an attack could also be launched to flood the victim with spoofed traceback messages, which would prevent operation of the monitor agent during this monitor-process. The rate of passing through messages may be limited by the firewall installed before the user network. In this way the firewall can drop a proportion of traceback packets if the rate is too high. The weight of a path in the path matrix also depends on the frequency of the receipt of traceback packets from along the path, so using a traceback attack a malicious user could generate a path information which is highly weighted. One solution is provided by the protocol in that the monitor agent can request a remote router, either directly or indirectly, if the router is suspected of being along the attacker path, to increase its frequency of traceback message generation, so as to allow the real path to be more easily detected. A secure signaling mechanism, as described below in relation to FIG. 7, may be used.

The monitor agent 204 uses the authentication part 222 in order to distinguish true and false paths. To reduce processing and signaling overheads, authentication is preferably only used only during a suspected Denial of Service situation. Thus, when the resources of the system become congested because of malicious traffic flooding the system, the monitor agent 204 authenticates the chains on the path-matrix. In this method we use a TTP (trusted third party). Each ISP has its own secret key, which is preferably continually varied, and is used by its routers to sign the traceback messages they generate. The ISP distributes the current secret key to the traceback-capable routers under its control, and then distributes this secret securely to the other ISPs that support the traceback protocols. The routers generating traceback messages sign them with the information H (ISP Secret key, Message), where Message is the remainder of the traceback message.

The traceback message contains a field that identifies the ISP that administrates the router. A victim wishing to authenticate a message sends a request to the victim's ISP specifying the identifier of ISP that administrates the router, and it may either receive the secret key from its ISP to authenticate the message itself, or pass the message up to the ISP for authentication and receive a response indicating whether the message is genuine or false. Each ISP's secret key is periodically refreshed, for example every 15 minutes. The selective authentication of the traceback packet does not necessitate excessive processing load, but a victim can still validate an attacker path using only secure information. For example, authentication could be performed only if under a suspected DoS attack, and optionally only if a disproportionate number of traceback messages are received. Thus, authentication of a traceback packet occurs only once a traffic path reaches a predetermined weight in the corresponding entry of the path matrix. If the traffic path does not pass this authentication, it will be dropped.

Once a likely attacker path has been detected and authenticated during a Denial of Service attack, the path is passed to the attack mitigation agent 212 to begin its mitigation procedures.

Figure 6:
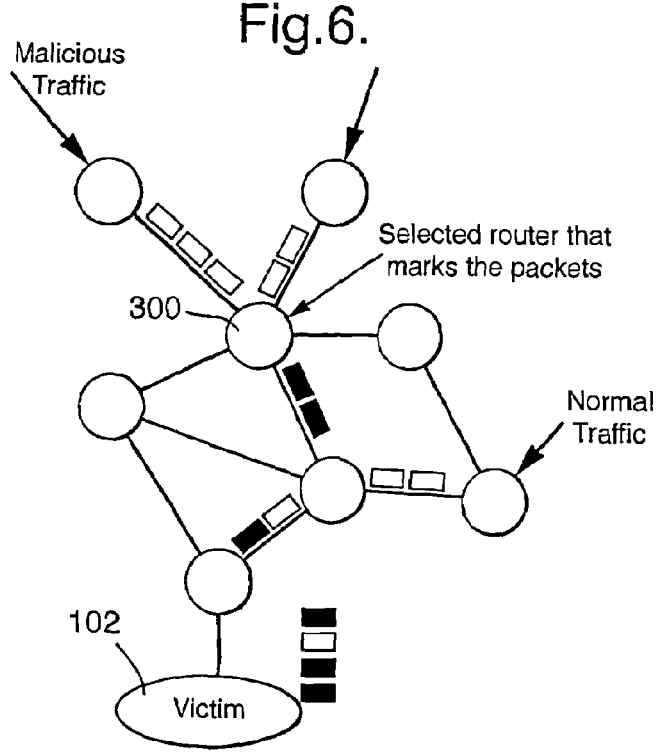
FIG. 6 shows a schematic illustration of a data traffic marking procedure.
Figure 7:
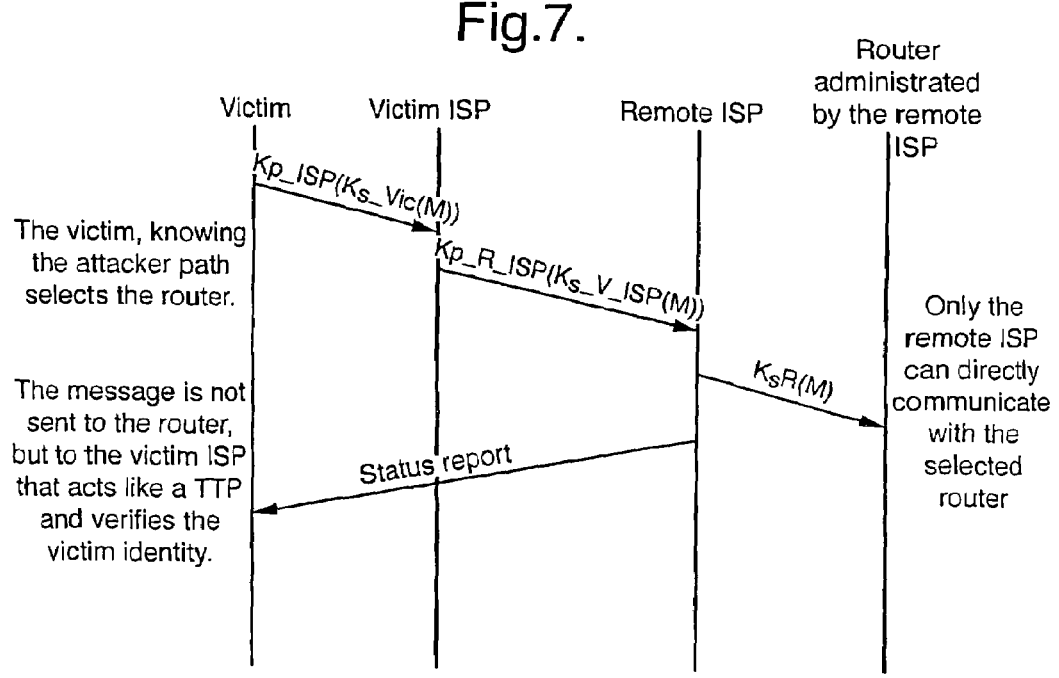
FIG. 7 shows a schematic illustration of a communication mechanism between a victim and a remote router.

During a Denial of Service attack, even a path which has been detected in the path matrix and authenticated may not be the correct or only attacker path. The attack mitigation agent is to interwork with a router away from the victim and as close as possible to the attacker to close down the attack, and preferably first uses a marking procedure at the selected router for the traffic towards the victim. This router is normally an edge router close to the attacker. The marking procedure allows the victim to characterize the traffic coming from this network entity. When the traffic arrives on the victim's side, the victim can check if this traffic is responsible for the DoS situation and can further verify the attacker path. The markings is carried out on the basis of a well defined destination address (that of the victim), as illustrated in FIG. 6. When a packet directed to the victim arrives at the selected router 300, the router marks the packet. For example, a header field of the data packets forming the data traffic containing data which is decremented by a packet forwarding node forwarding the packets may be altered. This selected router must implement the protocol stack 200, to allow the victim to communicate therewith, either directly or indirectly (via the ISPs), to initiate the marking procedure. The marking procedure is preferably initiated and controlled by the victim using a secure signaling mechanism. A preferred signaling mechanism, as illustrated in FIG. 7, is one in which the victim treats its ISP as a trusted third party (TTP) in the signaling mechanism, which in turn treats remote ISP as a further TTP. The remote ISP then carries out the requested action on the remote router.

Referring to FIG. 7, a victim is able to communicate a message M to the remote router securely. The message contains the IP address of the victim and the remote router and a request for the remote router to carry out an action relating to traffic directed at the victim's IP address, such as to change a traceback message generation rate, to begin marking packets destined for the victim or to install a filter (to be described below). The system of the victim first encrypts the message with its own secret key, shared with its ISP, Ks_Vic, then encrypts the result with the public key of the ISP, Kp_ISP. The result is sent to the local ISP 208. The local ISP decrypts the message, identifies the remote router's ISP, encrypts the message M with its own secret key, shared with the remote ISP 210, KS_V_ISP, and encrypts the result with the remote ISP's public key Kp_R_ISP. The result is sent to the remote ISP. The remote ISP decrypts the message, reads it and determines whether the requested action is within its own router management policy. If so, it encrypts the message with the secret key of the selected router, Ks_R, and sends it to the selected router. On receipt, the selected router decrypts the message and carries out the requested action. The remote ISP also sends a status report direct to the victim.

In one embodiment, marking is carried out in the TTL field of the IP header. Normally the TTL field is set to 64 by a sender. In our case the TTL information is set by the selected router to a variable number different than 64 which does not result in a TTL received at the victim which is equal to that of any significant amount of current traffic. The victim specifies this number at the router, thus it will recognize packets coming by means of a characteristic TTL, equal to the specified initial TTL minus the number of hops the router is away. The victim knows the distance to the selected router, from information in the authenticated traceback packets. To take into account the fact that the packets do not always follow the same path in the network, which is even more likely during a congestion situation like a flooding attack, the victim may characterize the marked traffic by a range of TTL values.

One advantage of this procedure is that the attacker cannot know the identity of the selected router, which sets the TTL information. Furthermore, the marking procedure does not cause additional traffic in the network, which is an important consideration since the bandwidth of the network is the parameter most afflicted during a flooding attack.

One potential problem is the possibility of a routing loop at the router that marks the packet, and if the router continuously updates the TTL, the packet could stay in the network for an indefinite time. This problem may be solved by specifying in the protocol that the value of the TTL must not be increased, compared with the TTL of the incoming packet, by the selected router, and/or by marking only a fraction of the packets directed to the victim, instead of applying a marking operation to all packets directed at the victim.

The attack mitigation agent 212 then monitors the incoming marked packets to determine whether or not the malicious traffic is predominantly, or at least significantly, traversing the selected router. Known methods can be used to distinguish malicious traffic from legitimate traffic. The attack mitigation agent can also determine whether a significant proportion of its traffic traversing the selected router is legitimate. If so, it may select to set up a marking procedure at a different selected route to determine whether the effect on legitimate traffic would be less if an output filter were installed. One way to defeat the problem of anonymous attack flood is to eliminate only malicious traffic in a router close to the attacker. However, the victim must be able to characterize the malicious traffic well enough such that it can be perfectly distinguished from legitimate traffic. The problem is that such characterization is not easy, and sometimes impossible, to perform, and in any case is time-consuming so might not be useful in dealing with a sophisticated Denial of Service attack as it occurs.

Therefore, the preferred method of the present invention is to select the appropriate router(s) to be close to the attacker and to minimize the effect on legitimate traffic if possible, and to treat all traffic directed at the victim equally at that point.

Figure 8:
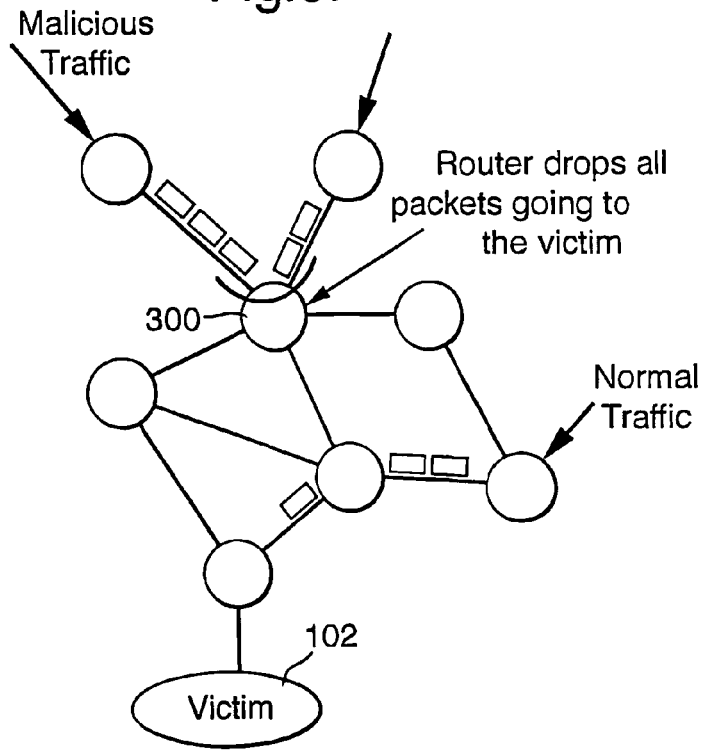
FIG. 8 shows a schematic illustration of a data traffic filtering procedure.

One method, illustrated in FIG. 8, is to configure the selected router to block packets that arrive with the destination address of the victim. This approach requires only an output filter capability on the router. The attack mitigation agent 212 may initiate the placement of an output filter at the selected remote server by a secure signaling mechanism as described in relation to FIG. 7 above. The remote router 300 then drops all incoming packets directed at the victim's IP address for a predetermined period unless instructed by the victim, via its ISP, otherwise.

Figure 9:
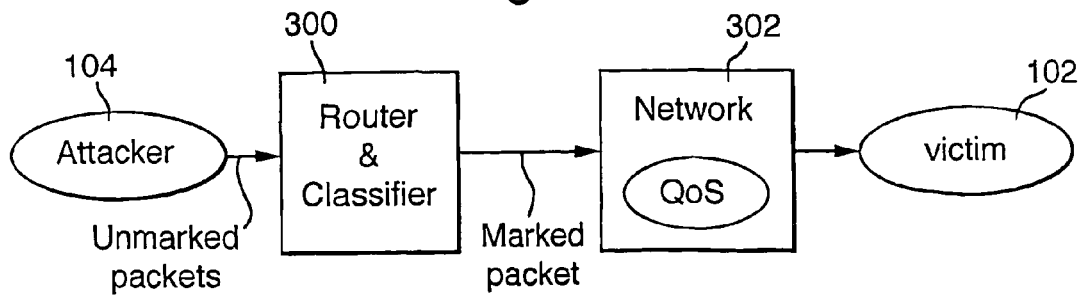
FIG. 9 shows a schematic illustration of a data traffic Quality of Service reducing procedure.

Instead of installing a filter in a router, which may in itself provide an attacker with a desired Denial of Service for legitimate users whose traffic is also filtered out, a Quality of Service (QoS) function of the routing network may be utilized as depicted in FIG. 9. Traditionally, QoS provides a network with the ability to provide better service to selected network traffic. In this alternative, the traffic destined to the victim is categorized at the selected router 300 with a lower QoS priority than the normal best effort traffic, thus making it possible to manage malicious traffic with the QoS functions. In this embodiment this categorization may be performed by the victim in co-operation with the selected router, using a QoS protocol referred to as Differentiated Service.

Differentiated Service (DS), as described in S. Blake et al: RFC-2475, An Architecture for Differentiated Service, is a multiple service model that can satisfy differing QoS requirements. The architecture is flexible in the sense that it does not define specific services. Packets arriving at the incoming edge of the network (the first router which is DS capable) are marked. In this marking operation a Differentiated Service field is set to a selected value. The mark that a packet receives identifies the class of traffic to which it belongs. After being marked, a packet may be then forwarded into the network, delayed or dropped. When a DS-marked packet arrives at a DS-capable router, the packet is forwarded onto its next hop according to the so-called per-hop behavior associated with the packet class. The per-hop behavior specifies how the packet is managed. This information is determined by the DS field.

For Differentiated Service, the network 302 tries to deliver a particular kind of service based on the QoS specified by each packet. The edge functions of DS, in which the packets are marked with a QoS category, are in this embodiment accomplished by the selected router 300 setting an appropriate value in the DS field on request of the victim. Again, a secure signaling mechanism as described above in relation to FIG. 7 may be used. The packets are marked with a low priority, and may be discarded or delayed by the congestion avoidance algorithm provided by the QoS protocols. This resolves the problem of the total traffic cut-out that occurs with an output filter. All incoming packets are not automatically dropped by the selected router but are only marked with a low priority QoS category, and may reach the victim if for example the Denial of Service attack subsides. The flooding attack is not managed only by the victim or only by the selected router. All network entities along the attacker path may contribute to the attack mitigation. If the marked traffic congests some parts of the network it can easily be discarded.

Thus, the present invention provides an effective and reliable way of dealing with Denial of Service attacks. The network of the victim is not congested by the hostile traffic, and the connectivity of the victim is preserved.

It is to be mentioned that variations and modifications may be made in relation to the above-described embodiments without departing from the scope of the invention, which is defined by the appended claims. For example, instead of tracing packets being sent separately to the data triggering its generation, tracing data may be inserted or appended to packets by forwarding routers.

What is claimed is:

1. A method of managing data traffic received at a network node and destined therefore from a packet data communication network so as to reduce adverse impacts caused by a denial of service attack on said network node, said method comprising, at the network node:
   a) monitoring tracing data generated by at least one remote packet forwarding node in the network and which allows the identity of said at least one remote packet forwarding node in the network which is responsible for forwarding at least some received denial of service attack data traffic to the network node to be found;
   b) identifying the presence of received denial of service attack data at the network node based on said monitoring of tracing data; and
   c) transmitting a request from the network node for the remote packet forwarding node to alter its handling of data traffic, destined for the network node in response to said identifying step.

2. A method as in claim 1, wherein the request is for the remote packet forwarding node to selectively alter the handling of data traffic directed at the network node without altering the handling of data traffic being forwarded to other nodes.

3. A method as in claim 1, wherein the request is to mark data traffic being forwarded to the network node with a characteristic allowing the data traffic being forwarded to be distinguished from data traffic being forwarded via a different path.

4. A method as in claim 3, wherein the marking is carried out in a header field of data packets forming data traffic being forwarded to the network node, said header field containing data which is decremented by each packet forwarding node in the network forwarding the packets.

5. A method as in claim 1, wherein the request is to cause the remote packet forwarding node to selectively reduce the amount of data traffic being sent to the network node.

6. A method as in claim 5, wherein the request is for the remote packet forwarding node to filer out at least a proportion of the data traffic being forwarded to the network node.

7. A method as in claim 5, wherein the request is for the remote packet forwarding node to mark the data traffic being forwarded to the network node with a reduced Quality of Service assignment in the communications network.

8. A method as in claim 1, wherein the request is transmitted from the network node to an administrative entity for the domain in which the network node receives service from the communications network.

9. A method as in claim 8, further comprising:
   transmitting the request from the said administrative entity to a further administrative entity for the domain in which the remote packet forwarding node is located.

10. A method of managing data traffic received at a packet forwarding node in a packet data communications network so as to reduce adverse impacts caused by a denial of service attack on at least one node in said network, said method comprising, at the packet forwarding node:
    a) forwarding data traffic destined for a network node towards that node, the data traffic including tracing data allowing the identity of said packet forwarding node to be found, the data traffic being forwarded in a manner that permits the network node to detect a denial of service attack thereon;
    b) receiving a request from the network node based on a detected denial of service attack based on said tracing data, the request being for the packet forwarding node to selectively alter its handling of data traffic destined for the requesting network node; and
    c) altering the handling of traffic data at the remote packet forwarding node in accordance with the request so as to reduce adverse impacts caused by said detected denial of service attack.

11. A method for managing data traffic in a multi-node packet data communications network which may include data traffic directed towards at least one node thereof in a denial of service attack, said method comprising:
    detecting, at an attacked node, a suspected denial of service attack including identification of a remote packet forwarding node as being on a forwarding path for suspected attack data being received;
    sending a request message from said attacked node to said identified remote packet forwarding node requesting a change in the handling of traffic being forwarded to the attacked node; and
    at the identified remote packet forwarding node, in response to receipt of said request message, changing the handling traffic being forwarded to the attacked node as requested so as to reduce adverse impacts caused by a denial of service attack on that node without changing the handling of traffic being forwarded to other network nodes.

12. A method as in claim 11 wherein said requested change comprises marking of data traffic being forwarded to the attacked node with a characteristic that permits forwarded data traffic from said identified remote forwarding node to be distinguished from data traffic being forwarded thereto via a different path thus allowing the attacked node to classify data received via the identified remote forwarding node.

13. A method as in claim 11 wherein said requested change comprises reducing the amount of traffic being forwarded to the attacked node to provide more time to reduce traffic data problems being experienced at the attacked node.

14. A method as in claim 11 wherein said requested change comprises reducing a network assigned quality of service parameter for traffic being directed to the attacked node thus increasing the likelihood that such data traffic will be automatically dropped due to a lower quality of service assignment on the network.

15. A method of reducing congestion problems experienced by a network node caused by a denial of service attack thereon by altering the handling of data traffic at a packet forwarding node in a packet data communications network in response to a detected denial of service attack, said method comprising, at the packet forwarding node:

(a) receiving traffic data at said packet forwarding node after receiving a request based on detected denial of service attack data at the network node; and (b) reducing a Quality of Service network setting for the received traffic data in response to said request, such that there is an increased likelihood that the traffic data will be dropped by subsequent packet forwarding nodes in the communications network to which the traffic data is forwarded.

16. A method as in claim 15 further comprising:

detecting data traffic directed towards said network node, and selectively reducing a Quality of Service setting only for the said detected data traffic being forwarded to said network node.

17. A method as in claim 15 further comprising:

performing said reducing step selectively in response to the receipt of a request from a network entity so as to affect only data traffic being forwarded to said network node.

18. A method as in claim 17, wherein said request is originated at said network node.

19. A method as in claim 17, wherein the request is transmitted from its originating network node and received in accordance with secure data transfer mechanism characteristic of a network entity trusted by the packet forwarding node.

* * * * *